E. RENDANO.
METAL SHEAR.
APPLICATION FILED APR. 9, 1920.
1,372,040.
Patented Mar. 22, 1921.
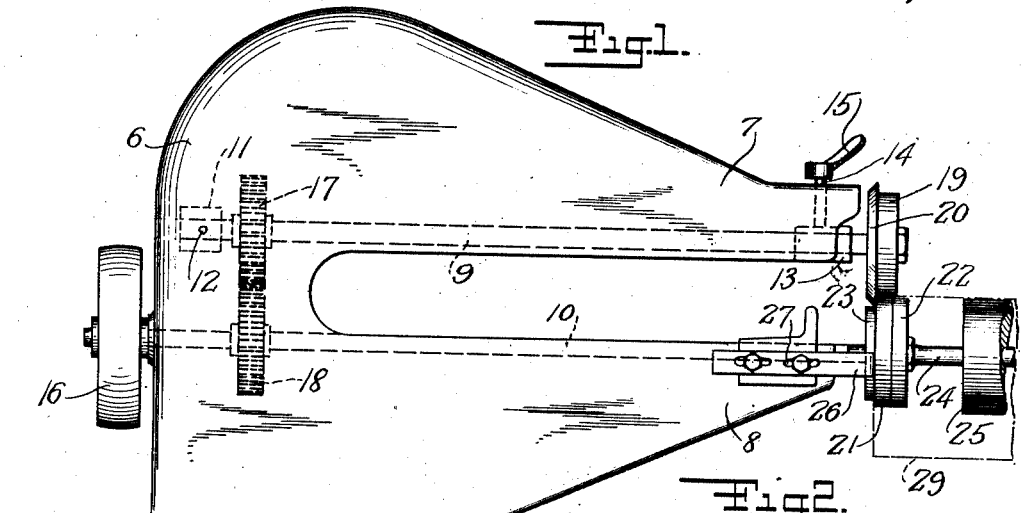
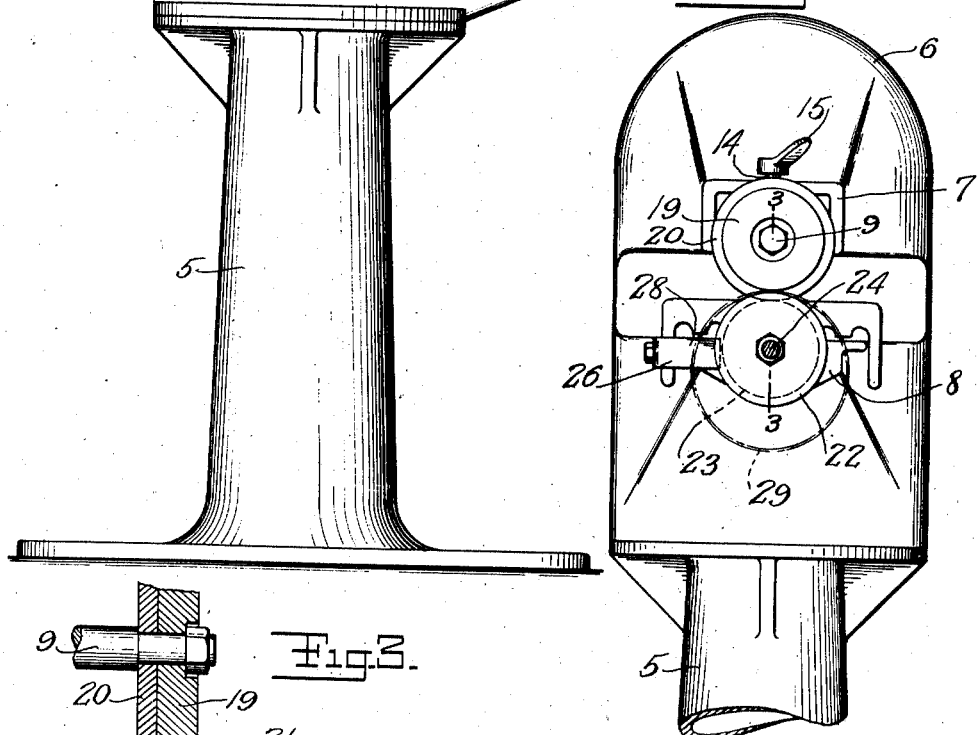
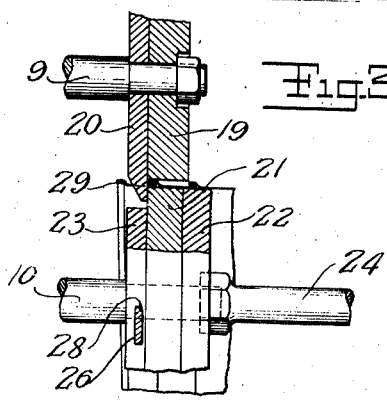
Inventor
Emil Rendano
By his Attorneys

UNITED STATES PATENT OFFICE.

EMIL RENDANO, OF BROOKLYN, NEW YORK, ASSIGNOR TO FORBES TUBULAR PRODUCTS CORPORATION, OF BROOKLYN, NEW YORK, A CORPORATION OF NEW YORK.

METAL-SHEAR.

1,372,040.  Specification of Letters Patent.  Patented Mar. 22, 1921.

Application filed April 9, 1920. Serial No. 372,424.

*To all whom it may concern:*

Be it known that I, EMIL RENDANO, a citizen of the United States of America, residing at Brooklyn, New York, have invented a new and useful Metal-Shear, of which the following is a specification.

My invention relates in general to a shear, and more particularly to a shear for cutting off the irregular end of a tubular body.

An object of my invention is to provide a shear which will cut off a substantially triangular shaped piece from the end of a spirally made tubular body such as set forth in my co-pending application, Serial No. 372,423, filed April 9, 1920, and thereby have the body sheared off square on the end.

Another object is to provide a shear having means for feeding the material to the shearing rolls.

Another object is to provide guiding means for guiding a tubular body while being sheared.

Other objects and advantages will appear as the specification proceeds.

In the drawings, which show merely a preferred form of my invention,

Figure 1 is a side elevation of my machine showing in dotted lines a tubular body being sheared.

Fig. 2 is a fragmentary end elevation thereof.

Fig. 3 is a fragmentary sectional view taken substantially in the plane of the line 3—3 of Fig. 2.

Upon a suitable base 5 is mounted a frame 6 having jaws 7 and 8. Within the frame are journaled shafts 9—10. The inner end of shaft 9 may be mounted to turn in a journal box having trunnions 12—12 whereby said box may be rocked. For supporting the other end of the shaft 9, I have shown a suitable journal box 13. This box may be adjusted up and down within the frame, as by means of the adjusting screw 14 and handle 15.

Suitable means such as the pulley 16 on shaft 10 may be provided for driving both shafts. Mounted upon the shafts 9 and 10 within the frame 6, there may be provided intermeshing gears 17—18 for gearing the shafts together.

Mounted upon the shaft 9, I have shown feed and shear mechanism. This may be conveniently formed of a feed roll 19 preferably of hardened steel. Adjacent the feed roll 19 is the shear roll 20. This latter roll is preferably of substantially frusto conical shape for a purpose to be hereinafter described. The roll 20 may likewise be of hardened steel. Mounted upon the shaft 10 for coöperation with the rolls 19 and 20, I have shown a second feed and shear mechanism. This may consist of a combined feed and shear roll 21 which coöperates with the shear roll 20 when shearing the metal. The rolls 19 and 21 which are normally spaced apart a distance substantially equal to the thickness of the tubular body to be cut serve to feed the body during the shearing process. A roll 22 may be mounted on the shaft 10 to assist in guiding and feeding a tubular body to the shearing rolls. A spacer such as 23 may be provided for bringing the edges of the rolls 20 and 21 into proper shearing position. Means for partially supporting and guiding a tubular body may be provided. For this purpose, I have shown a shaft 24 suitably secured to the shaft 10 and in effect forming an extension of the latter. Upon this shaft 24 is secured a suitable support such as the roll or pulley 25. The rolls 21, 22, and 25 should be of substantially the same diameter in order to properly guide and support the tubular body.

Mounted upon the frame there may be a suitable guide or stop such as 26. This guide is preferably made adjustable, as by means of the bolt and slot connection 27. One edge of the guide 26 is preferably slightly rounded as shown at 28 to prevent any projection on the tubular body from catching thereon.

The operation of my machine is as follows:

The rolls 19 and 21 are first spaced apart a proper distance to permit the introduction of the wall of a tubular body therebetween. The tubular body having a spiral or projecting end as hereinbefore described is then placed between the rolls with the base of the body substantially up to the roll 20. As shown in Fig. 3 (dotted lines) the irregular end 29 of the body will then project beyond the shear roll 20 but will be closely adjacent thereto. The guide 26 will be adjusted so as to be in substantially the same plane with the shearing edges of the rolls, 20—21. The end of the body will then abut against the stop or guide member 26, and the interior surface of the body will rest upon the guide roll 25. The feed and shear mechanism 19—20 is next screwed down so as to tightly clamp the body between the rolls 19 and 21, 22, so that upon rotation of the shafts, the body will be fed through the shearing rolls. The shafts will then be rotated and the projecting end of the body sheared off by the shearing rolls 20, 21 while the body is guided by means of the roll 25, guide or stop member 26, and feed rolls 19 and 21. Due to the frusto-conical shape of the roll 20, the sheared off end of the body will be permitted to curl up and fall to the rear of the shears.

While I have described the shear in some detail, and as particularly adapted for shearing bodies with spiral or irregular projecting ends, it is desired that it be understood that various modifications may be made, and that the shear may be used for various other purposes.

I claim:

1. In a shear for trimming the end of a sheet metal tube, a frame, a pair of shafts mounted for rotation in said frame, a pair of shearing rolls mounted upon said shafts, and a guide mounted on said frame and having an extended bearing surface in a plane substantially that of the shearing edges of said rolls whereby tubes of various diameters may be sheared and the ends be guided by said guide without readjustment of the latter.

2. In a shear for trimming the end of a sheet metal tube, a frame, a pair of shafts mounted for rotation in said frame, a pair of shearing rolls mounted upon said shafts, means for feeding a tube to the shearing rolls, a guide for the end of a tube being sheared and having an extended bearing surface in a plane substantially that of the cutting edges of the shearing rolls, and a support for supporting the body of a tube while being sheared.

3. In a shear for trimming the end of a spiral sheet metal tube, a frame, a pair of shafts mounted for rotation in said frame, a pair of shearing rolls mounted upon said shafts, a feed roll mounted upon one of said shafts and coöperating with one of said shearing rolls for feeding the body of a tube to the shearing rolls, and a substantially flat guide mounted upon said frame and in a plane substantially that of the shearing edges of said rolls.

4. In a shear for trimming the end of a spiral sheet metal tube, a frame, a pair of shafts mounted for rotation in said frame, a pair of shearing rolls mounted upon said shafts, a pair of feed rolls mounted upon said shafts for feeding the body of a tube to the shearing rolls, one of said shearing rolls being of substantially frusto-conical shape to permit the sheared off edge of the tube to curl up and fall to the rear of the rolls, and a substantially flat guide mounted upon said frame and in a plane substantially that of the shearing edges of said rolls.

5. In a device of the character described, a frame, a shaft mounted for rotation in said frame, a frusto conical shear roll and a feed roll mounted upon said shaft, a second shaft mounted for rotation in said frame, a combined feed and shear roll mounted upon said last mentioned shaft and coöperating with the rolls on said first mentioned shaft, an extension on one of said shafts, a support mounted thereon for supporting a body being sheared, and an adjustable stop or guide mounted on said frame and in a plane substantially that of the shearing edges of said shear rolls, said stop or guide having a rouned edge.

EMIL RENDANO.